US012602179B2

(12) United States Patent
Rho et al.

(10) Patent No.: US 12,602,179 B2
(45) Date of Patent: Apr. 14, 2026

(54) MEMORY SYSTEM FOR TAILORING DATA, HOST SYSTEM FOR CONTROLLING THE MEMORY SYSTEM, AND OPERATION METHOD OF THE MEMORY SYSTEM

(71) Applicant: Samsung Electronics Co., Ltd., Suwon-si (KR)

(72) Inventors: Eunhee Rho, Suwon-si (KR); Seokhwan Kim, Suwon-si (KR); Yonggil Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/170,354

(22) Filed: Feb. 16, 2023

(65) Prior Publication Data

US 2023/0266896 A1 Aug. 24, 2023

(30) Foreign Application Priority Data

Feb. 18, 2022 (KR) ........................ 10-2022-0021733
Jun. 21, 2022 (KR) ........................ 10-2022-0075777

(51) Int. Cl.
*G06F 12/00* (2006.01)
*G06F 3/06* (2006.01)
(52) U.S. Cl.
CPC .......... *G06F 3/0631* (2013.01); *G06F 3/0623* (2013.01); *G06F 3/064* (2013.01); *G06F 3/0679* (2013.01)
(58) Field of Classification Search
CPC ....... G06F 3/0631; G06F 3/064; G06F 3/0679
USPC ....................................................... 711/154
See application file for complete search history.

(56) References Cited

U.S. PATENT DOCUMENTS

| | | | |
|---|---|---|---|
| 8,893,146 B2 | 11/2014 | Muppirala et al. | |
| 8,898,351 B2 | 11/2014 | Povaliaev et al. | |
| 10,402,096 B2 | 9/2019 | Sen et al. | |
| 11,281,574 B2 * | 3/2022 | Hwang | G06F 12/0882 |

(Continued)

FOREIGN PATENT DOCUMENTS

| | | |
|---|---|---|
| CN | 107832007 A | 3/2018 |
| EP | 3 848 812 A1 | 7/2021 |

(Continued)

OTHER PUBLICATIONS

Extended European Search Report for European Patent Application No. 23157042.5 issued on Jun. 21, 2023.

*Primary Examiner* — Mohamed M Gebril
(74) *Attorney, Agent, or Firm* — Harness, Dickey & Pierce, P.L.C.

(57) ABSTRACT

A memory system may include a host system configured to split at least one data stream into a plurality of split data streams, grouping at least one unmergeable first data stream among the plurality of split data streams, and merging at least one mergeable second data stream among the plurality of split data streams, a storage device comprising one or more flash memory devices, the storage device including at least one first region and at least one second region, and processing circuitry configured to, receive at least one request to allocate at least one storage region for the tailored at least one data stream from the host system, store data blocks associated with the at least one first data stream in the first region, and store data blocks associated with the at least one second data stream in the second region.

20 Claims, 15 Drawing Sheets

(56)        References Cited

U.S. PATENT DOCUMENTS

| | | | |
|---|---|---|---|
| 2011/0252187 A1* | 10/2011 | Segal | G06F 12/0246 |
| | | | 711/E12.008 |
| 2016/0335001 A1 | 11/2016 | Heller et al. | |
| 2017/0031626 A1 | 2/2017 | Kim et al. | |
| 2017/0031631 A1* | 2/2017 | Lee | G06F 3/0679 |
| 2018/0150220 A1 | 5/2018 | Pandian et al. | |
| 2019/0187900 A1 | 6/2019 | Byun | |
| 2019/0392546 A1* | 12/2019 | Flordal | G06T 1/60 |
| 2020/0401334 A1* | 12/2020 | Saxena | G06F 3/064 |

FOREIGN PATENT DOCUMENTS

| | | | | |
|---|---|---|---|---|
| KR | 101338566 B1 | 12/2013 | | |
| WO | WO-2012118743 A1* | 9/2012 | | G06F 12/0246 |

* cited by examiner

MEMORY SYSTEM FOR TAILORING DATA, HOST SYSTEM FOR CONTROLLING THE MEMORY SYSTEM, AND OPERATION METHOD OF THE MEMORY SYSTEM

CROSS-REFERENCE TO RELATED APPLICATIONS

This U.S. non-provisional application is based on and claims the benefit of priority under 35 U.S.C. § 119 to Korean Patent Application No. 10-2022-0021733, filed on Feb. 18, 2022, and Korean Patent Application No. 10-2022-0075777, filed on Jun. 21, 2022, in the Korean Intellectual Property Office, the disclosures of each of which are incorporated by reference herein in their entireties.

BACKGROUND

Various example embodiments of the inventive concepts relate to a memory device and/or a memory system, and more particularly, to a memory system for tailoring data, a host system for controlling the memory system, and/or an operation method of the memory system.

Storage systems include a host and a storage device. The host and the storage device are connected to each other through various standard interfaces, such as a universal flash storage (UFS), a serial ATA (SATA), a small computer small interface (SCSI), a serial attached SCSI (SAS), and/or an embedded MMC (eMMC). When storage systems are used in mobile devices, high-speed operation between a host and a storage device may be very important. However, when the amounts of upstream and downstream transmission between the host and the device are significantly different from each other, performance degradation may occur due to pileup of data to be transmitted.

Therefore, there is a desire for a technique for reducing the amount of single level cell (SLC) backup performed, and to save the space of a static RAM (SRAM) in a memory device in performing a data write operation.

SUMMARY

At least one example embodiment of the inventive concepts provide a method, performed by a host system, of tailoring pieces of data in advance and writing pieces of tailored data and pieces of non-tailored data to different storage regions.

At least one example embodiment of the inventive concepts provide a memory system capable of efficiently utilizing a storage space of a storage device by providing a data tailoring method.

According to at least one example embodiment of the inventive concepts, there is provided a memory system including a host system configured to split at least one data stream into a plurality of split data streams, grouping at least one unmergeable first data stream among the plurality of split data streams, and merging at least one mergeable second data stream among the plurality of split data streams, a storage device comprising one or more flash memory devices, the storage device including at least one first region and at least one second region, and processing circuitry configured to, receive at least one request to allocate at least one storage region for the tailored at least one data stream from the host system, store data blocks associated with the at least one first data stream in the first region, and store data blocks associated with the at least one second data stream in the second region.

According to at least one example embodiment of the inventive concepts, there is provided a host system comprising memory having computer readable instructions stored thereon, and processing circuitry configured to execute the computer readable instructions to cause the host system to, split a data stream into a plurality of split data streams, group unmergeable first data streams among the split data streams, merging mergeable second data streams among the split data streams, and control at least one storage device to store the first data streams and the second data streams in a first region of the at least one storage device and a second region of the at least one storage device, respectively.

According to at least one example embodiment of the inventive concepts, there is provided an operation method of a memory system, the operation method including splitting a data stream into a plurality of split data streams, grouping unmergeable first data streams among the split data streams, merging mergeable second data streams among the split data streams, transmitting a request to allocate at least two storage regions to a storage device, the at least two storage regions including a first region and a second region, and transmitting the first data streams and the second data streams to the storage device, the transmitting causing the storage device to store the first data streams in the first region, and store the second data streams in the second region.

BRIEF DESCRIPTION OF THE DRAWINGS

Various example embodiments will be more clearly understood from the following detailed description taken in conjunction with the accompanying drawings in which:

FIG. 4 is a block diagram for describing a data processing process performed by the host system according to at least one example embodiment.

FIG. 12 is a block diagram for describing a universal flash storage (UFS) system according to at least one example embodiment;

DETAILED DESCRIPTION

Terms used herein will be described briefly, and various example embodiments will be described in detail.

Figure 1:
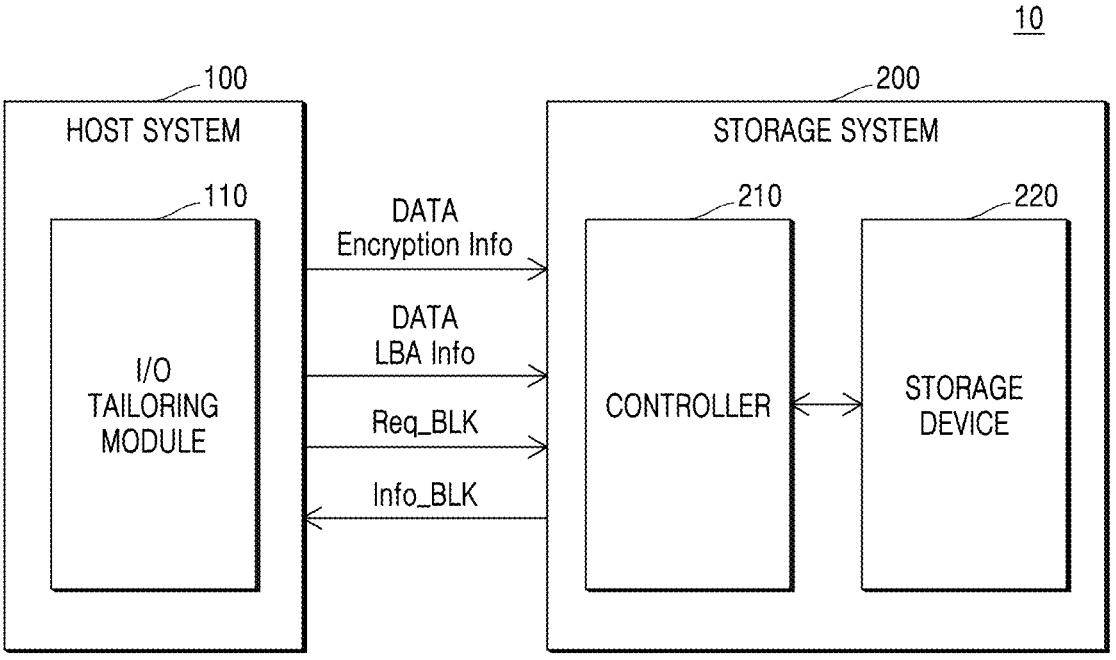
FIG. 1 is a block diagram of a memory system according to at least one example embodiment.

FIG. 1 is a block diagram of a memory system 10 according to at least one example embodiment.

Referring to FIG. 1, the memory system 10 includes a host system 100 and/or a storage system 200, etc., but the example embodiments are not limited thereto, and for example, the memory system 10 may include a greater or lesser number of constituent components.

The host system 100 may tailor a data stream. The data stream that is tailored may be a desired and/or pre-programmed input/output (I/O) data stream. Thus, the host system 100 may include an I/O tailoring module 110 (e.g., I/O tailoring circuitry, a I/O tailoring device, etc.). A process in which a host system tailors data will be described in detail later with reference to FIGS. 2, 3, 5, and 8.

The storage system 200 includes at least one controller 210 and/or at least one storage device 220, etc., but is not limited thereto. The controller 210 may be implemented as processing circuitry which may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The controller 210 may receive desired and/or preset information related to and/or about a data stream from the host system 100, and may perform an encryption operation on the data stream, but is not limited thereto. The encryption operation may be carried out for each data stream, but is not limited thereto. The desired and/or preset information about the data stream may be encryption information input according to, for example, an Android operating system and/or other mobile operating system, but the example embodiments are not limited thereto.

The controller 210 may receive storage region information for, regarding, and/or associated with at least one data stream from the host system 100, and may designate at least one storage region of the storage device 100 where each data stream is stored. For example, the controller 210 may request from the host system 100 information about and/or regarding at least one mergeable condition for determining unmergeable data streams and mergeable data streams, etc. For convenience, the unmergeable data stream may be defined as a first data stream, and the mergeable data stream may be defined as a second data stream, but the example embodiments are not limited thereto.

For example, the controller 210 may request the host system 100 for information about and/or related to at least one mergeable condition (e.g., a mergeability condition, at least one condition for merging) for the first data stream and/or the second data stream in order to perform a storage region designation operation on the first data stream and the second data stream. According to at least one example embodiment, the mergeability condition refers to at least one condition and/or setting indicating whether the data stream may be split and/or subdivided into a plurality of smaller data streams or not. For example, data streams where it is desired to maintain the ordering of the data of the data stream (e.g., wherein the data is desired to be received in a desired order), such as VoIP data streams, streaming video data streams, and/or streaming audio data streams, etc., may be indicated as being unmergeable data streams, whereas data streams wherein the maintenance of the ordering of the data included in the data stream is not necessary and/or desired, such as file transfers, etc., may be indicated as mergeable data streams. When the controller 210 receives mergeable condition information for each data stream, the mergeable data stream may be stored in, e.g., a multi-bit NAND flash storage region (e.g., a non-volatile memory device, etc.), and the unmergeable data stream may be stored in, e.g., a static RAM (SRAM) storage region (e.g., a volatile memory device, etc.), but the example embodiments are not limited thereto. For convenience, the SRAM storage region may be defined as a first region, and the multi-bit NAND flash storage region may be defined as a second region, but are not limited thereto. Second data streams may be stored in the second region without using the first region. In other words, the first region and the second region may be independent from each other, and one or more of the second data streams may be stored in the second region, independently from the storage of one or more first data streams, etc.

The storage device 220 may include one or more flash memory devices, and may store respective data by dividing storage regions according to and/or corresponding to the possibility of data merging. As described above, a storage device may be a zoned universal flash storage (UFS) in which regions are divided according to and/or corresponding to the possibility of data merging, but the example embodiments are not limited thereto. The storage device 220 may include a multi-bit NAND flash storage region and/or an SRAM storage region, etc., but are not limited thereto. The multi-bit NAND flash storage region may include a plurality of logical units (e.g., logical storage regions, etc.). The storage device 220 may be, but is not limited to, the above-described UFS device.

For example, when the SRAM storage region is defined as the first region and the multi-bit NAND flash storage region is defined as the second region, the mergeable data stream may be stored in the multi-bit NAND flash storage region (e.g., the non-volatile memory device and/or the non-volatile storage region, etc.), and the unmergeable data stream may be stored in the SRAM storage region (e.g., the volatile memory device and/or the volatile storage region, etc.), but the example embodiments are not limited thereto. The host system 100 may process and/or directly process data in the first region of the storage device 220 with respect to the unmergeable first data streams. A description of at least one method, performed by the storage device 200, of processing data will be described in detail later with reference to FIGS. 8 and 9.

Figure 2:
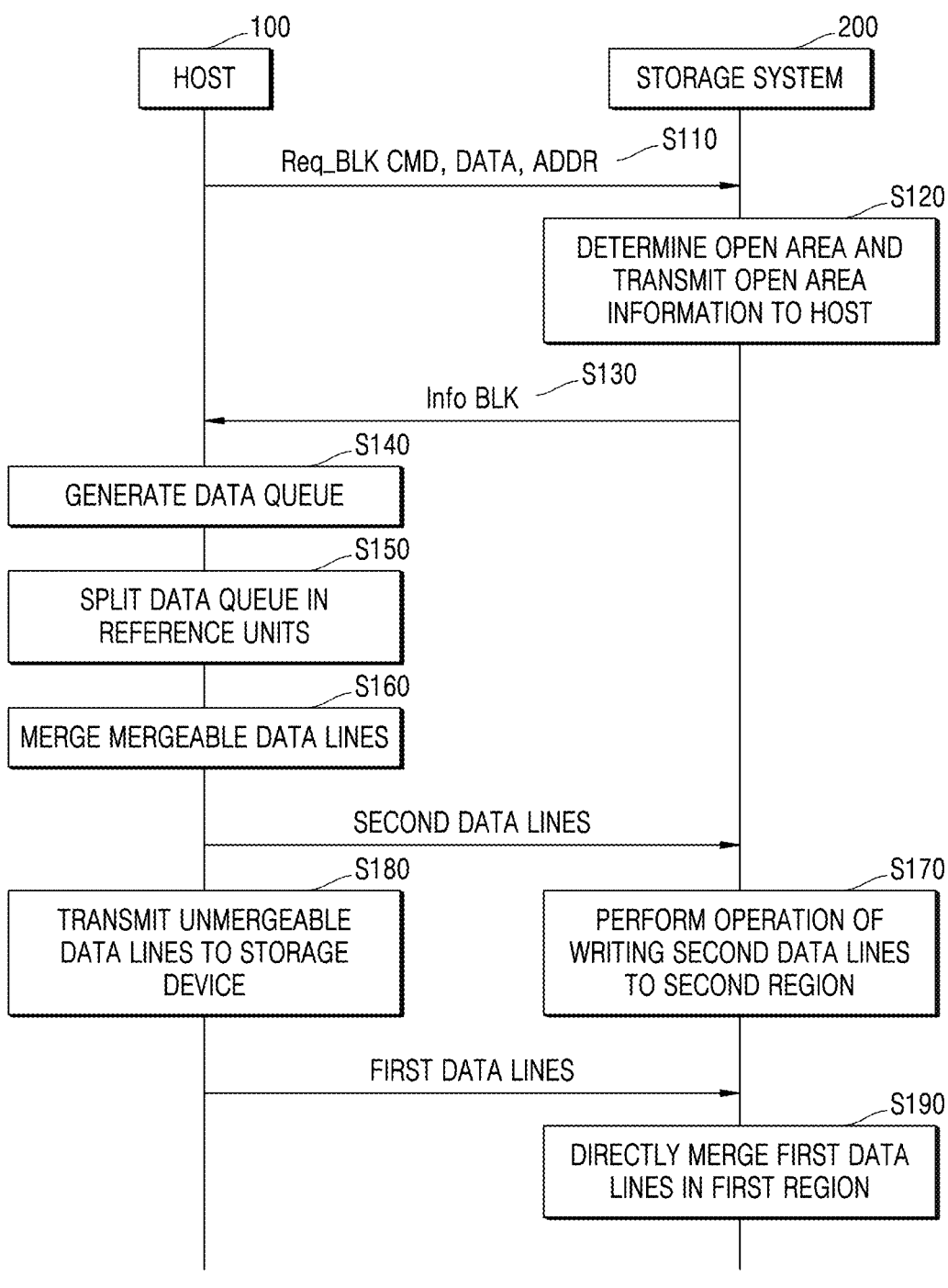
FIG. 2 is a flowchart of a data processing method according to at least one example embodiment.

FIG. 2 is a flowchart of a data processing method according to at least one example embodiment.

Referring to FIG. 2, in a data processing method performed by the memory system 10 according to at least one example embodiment, a request for the storage system 200 of the host system 100 starts.

The host system 100 may transmit a signal Req_BLK requesting information about and/or related to an open block, a command signal CMD for at least one storage device and/or at least one controller, a data transmission signal DATA, and/or a storage region address allocation signal ADDR, etc., to the storage system 200 (S110). The open block (e.g., free memory block, etc.) refers to a region (e.g., memory region, etc.) in a state in which data writing is possible among the storage regions existing in the storage device 220.

In response to receiving a request for information about and/or related to an open area from the host system 100, the storage system 200 determines (and/or identifies, etc.) the open area and transmits the open area information (e.g., information associated with, related to and/or corresponding to the identified open area, etc.) to a host (S120). For example, the storage system 200 may determine whether a storage region in which an unsplittable data stream (e.g., a first type of data stream, etc.) may be stored exists among the storage regions of the storage device 220, and/or may determine whether a storage region in which a splittable data stream (e.g., a second type of data stream, etc.) may be stored exists among the storage regions of the storage device 220, and may transmit information on the storage region according to the characteristics of the data stream (e.g., unsplittable data or splittable data may be stored, first type or second type, etc.) to the host system 100.

In response to an open area is determined and/or identified by the storage system 200, information Info_BLK about and/or corresponding to the open area is transmitted to the host system 200 (S130).

The host system 100 receives the information Info_BLK about and/or corresponding to the open area, and generates a data queue (e.g., I/O Queue, etc.) (S140). The data queue may be generated based on the characteristics of each data stream (e.g., the results of the determination of whether the data stream is a splittable data stream or an unsplittable data stream, etc.). For example, the host system 100 may process an unmergeable data stream (e.g., a first type data stream, an unsplittable data stream, etc.) into a first data stream and may process a mergeable data stream into a second data stream (e.g., a second type data stream, a splittable data stream, etc.). The host system 100 may generate a data stream suitable to the open area existing in the storage system 200. In other words, the host system 100 may set a target open area so that an arbitrary data stream (e.g., a desired data stream, a particular data stream, etc.) may be written to the storage area of the storage device 220, and may create a data queue, based on the capacity and type of the target open area.

In response to the data queue being created, the host system 100 splits the data queue into reference units (S150) (e.g., split into reference blocks of memory, etc.). The reference unit may be a programmed and/or pre-programmed unit, but the example embodiments are not limited thereto. For example, the host system 100 may sub-divide data streams extending over the boundary of a desired and/or preset reference unit into a plurality of data streams.

In response to the data queues being split, the host system 100 determines and/or identifies the mergeable data streams of the plurality of data streams, and merges the mergeable data streams, based on a result of the determination (S160). For convenience, the unmergeable data stream may be defined as a first data stream, and the mergeable data stream may be defined as a second data stream.

In response to the mergeable data streams being merged, the host system 100 may transmit the merged second data streams to the storage system 200, and the storage system 200 may perform an operation of writing the second data streams to the second region (S170). The second region may be a multi-bit NAND flash memory region, but the example embodiments of the inventive concepts are not limited thereto. The second data streams may be stored in the second region without using the first region (e.g., without storing the second data streams in the first region prior to storing the second data streams in the second region). In other words, the first region and the second region may be independent from each other, and the second data streams may be stored in the second region, independently from first data streams.

The host system 100 may directly transmit the unmergeable data streams to the storage system 200 (S180). The storage system 200 may receive unmergeable first data streams, and may store the received first data streams in the first region. The first region may be an SRAM memory region, but the example embodiments of the inventive concepts are not limited thereto.

In response to the first data streams, the storage system 200 may directly merge the first data stream in the first region (S190). For example, when the size of a data stream is smaller than the desired and/or preset reference unit, the host system 100 may not be able to merge the data stream into a unit that is smaller than the reference unit. The host system 100 may determine that the data stream is a first data stream, e.g., a data stream that can no longer be merged and/or should not be merged. In response to the determination that a merging operation for a first data stream is undesired and/or impossible, the host system 100 may group first data streams and transmit the grouped first data streams to the storage system 200.

The memory system 10 according to at least one example embodiment may efficiently use the storage space of the storage device 220 by splitting and merging a data stream through the above-described process. An operation of each component of the memory system 10 will now be described in detail.

Figure 3:
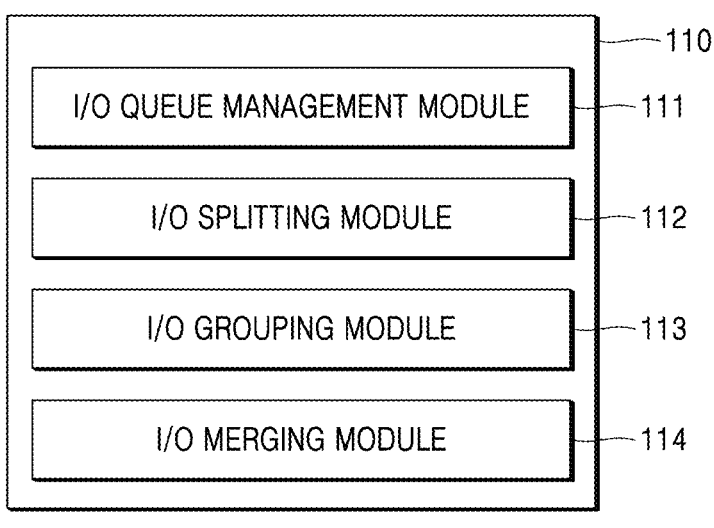
FIG. 3 is a block diagram of a host system according to at least one example embodiment.
Figure 4:
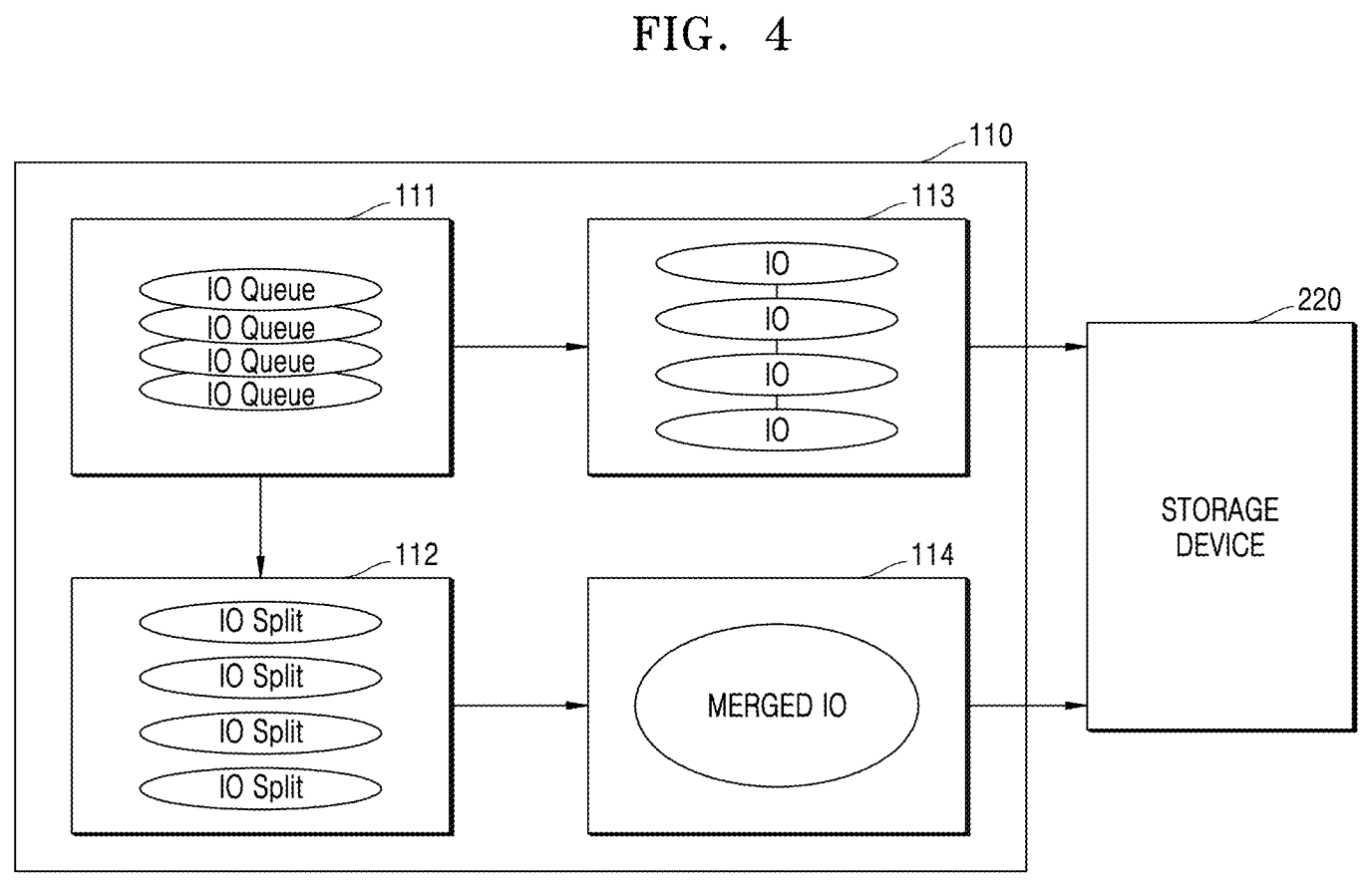

FIG. 3 is a block diagram of the host system 100 according to at least one example embodiment, and FIG. 4 is a block diagram for describing a data processing process performed by the host system 100 according to at least one example embodiment.

Referring to FIGS. 3 and 4, the host system 100 according to at least one example embodiment may include processing circuitry implementing and/or including an I/O queue management module 111, an I/O splitting module 112, an I/O grouping module 113, and/or an I/O merging module 114, etc. Here, I/O means a data stream that is utilized in the memory system 10 according to at least one example embodiment. The processing circuitry may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The I/O queue management module 111 may receive information about and/or regarding the size of each of the open blocks of the storage device 220 from the storage system 200, and may create a data queue (e.g., an I/O Queue, etc.) corresponding to each of the open blocks. For example, the I/O queue management module 111 may set a reference unit (e.g., a desired reference block size, desired data size, etc.) of a data stream, based on the received information about the size of each of the open blocks, and may create and/or generate a data stream which satisfies the set reference unit. The I/O queue management module 111 may process the data stream, based on address information (e.g., a logical block address (LBA), etc.) of an open area, and may create the data queue. The I/O queue management module 111 may create a data queue suitable for and/or corresponding to the size of the reference unit by splitting the data stream when data streams span the boundary of the size of the reference unit (e.g., exceed the size of one reference unit, etc.). If the size of the created data queue is the same as the size of the reference unit, the I/O queue management module 111 may determine whether the data queues are mergeable. As a result of the determination, the I/O queue management module 111 may transmit unmergeable data queues to the I/O grouping module 113. As a result of the determination, the I/O queue management module 111 may transmit mergeable data queues to the I/O merging module 114.

The I/O queue management module 111 may transmit a data stream determined to immediately need and/or desire a write operation to the I/O grouping module 113, and may control the storage system 200 so that a write operation may be performed and/or be directly performed in the first region of the storage device 220. For example, when a page reclaim and/or page wait occurs in the created I/O queue, corresponding data may be classified as an operation needed to be immediately executed, etc. In response to the operation needed to be immediately executed occurring, the I/O queue management module 111 may transmit a corresponding I/O to the I/O grouping module 113, and the I/O grouping module 113 may enable corresponding I/O operations to be processed to conform to the reference unit in the first region of the storage device 220.

The I/O splitting module 112 may generate split data streams (e.g., IO Splits) by tailoring and/or splitting the data streams extending over the boundary of the reference unit size to fit the reference unit. For example, if the size of the data stream is larger than the desired and/or preset reference unit, the I/O splitting module 112 may split data that exceeds the boundary of the reference unit in the data stream into a plurality of split data streams. The I/O splitting module 112 may transmit the split data streams to the I/O grouping module 113 and/or the I/O merging module 114, but is not limited thereto.

The I/O grouping module 113 groups pieces of unmergeable data (IO) among the split data streams obtained by the I/O splitting module 112, and transmits and/or directly transmits the grouped data pieces to the storage device 220. The unmergeable data pieces may be defined as a first data stream.

For example, in response to a determination that the split data streams are unable to be merged in the host system 100, the I/O grouping module 113 may wait for transmission of the data streams to the storage system 200 until the data streams satisfy the size of the reference unit. In other words, transmission of first data streams to the first region may be delayed until there is sufficient data to equal the size of the reference unit. In response to the sum of the sizes of unmergeable data streams meeting the reference unit, the I/O grouping module 113 may transmit data streams to the storage device 220 of the storage system 200 and the storage device 200 may directly merge the data streams. The data streams may be merged in the SRAM storage region of the storage device 200, but the example embodiments are not limited thereto. In other words, the first data streams are not directly merged in the host system 100, but may be merged by the storage system 200 in the first region of the storage device 220.

The I/O merging module 114 merges the mergeable data streams, and creates and/or generates a merged data stream (e.g., Merge IO) having the reference unit size and/or a smaller size than the reference unit. A mergeable data stream may be defined as a first data stream.

For example, the I/O merging module 114 may merge second data streams having smaller sizes than the desired and/or preset reference unit into one data stream having the reference unit size. In response to the second data streams being merged into the reference unit size, the I/O merging module 114 may transmit the second data stream to the storage device 220 of the storage system 200. The second data stream may be transmitted to the second region of the storage device 220, and the second region may be a multi-bit NAND flash memory region. The second region may include a zoned logical unit region which has been previously designated, but is not limited thereto. The storage device 220 may write the second data stream to the zoned logical unit region.

Figure 5:
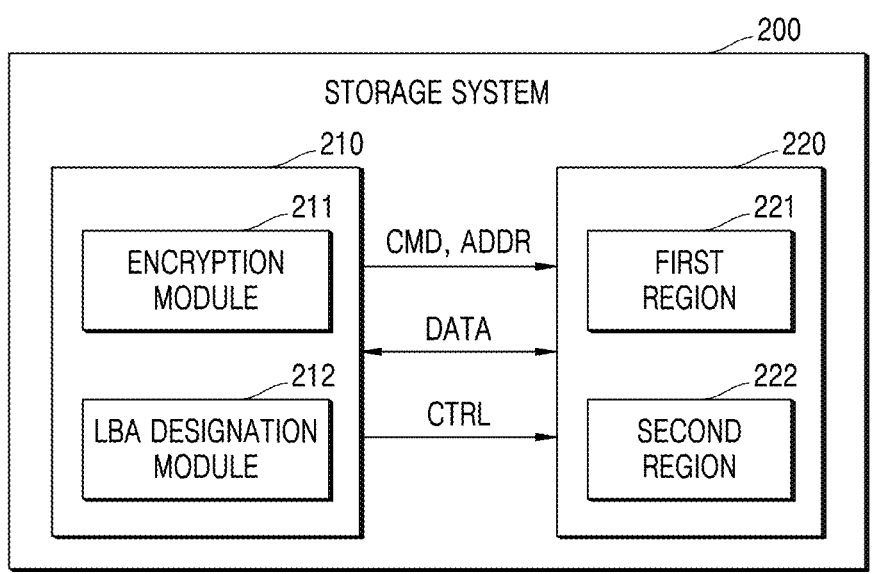
FIG. 5 is a block diagram of a storage system according to at least one example embodiment.

FIG. 5 is a block diagram of the storage system 200 according to at least one example embodiment.

Referring to FIG. 5, the storage system 200 includes a controller 210 and/or a storage device 220, etc., but the example embodiments are not limited thereto.

The controller 210 may be implemented as processing circuitry, and the processing circuitry may include and/or implement an encryption module 211, but is not limited thereto. The controller 210 according to at least one example embodiment may receive desired and/or preset information about a data stream from the host system 100, and may perform an encryption operation on the data stream. The encryption operation may be carried out for each data stream. The desired and/or preset information about the data stream may be encryption information input according to an Android operating system, but the example embodiments are not limited thereto.

The controller 210 may include a logical block address (LBA) designation module 212, etc. The controller 210 according to at least one example embodiment may receive desired and/or preset LBA information from the host system 100, and may designate a region in which a desired type of data stream is stored. The storage region may be classified into a first region or a second region according to the possibility of merging data streams, the first region may be defined as a region where an unmergeable data stream is stored (e.g., a first type of data stream, etc.), and the second region may be defined as a region where a mergeable data stream is stored (e.g., a second type of data stream, etc.). An LBA may be determined in the data stream according to open block region information of the storage device 220.

The storage device 220 includes at least one first region to which at least one data stream unmergeable in the host system 100 is written. The storage device 220 also includes at least one second region to which at least one data stream mergeable in the host system 100 is written. The unmergeable data stream in the host system 100 may be defined as the first data stream, and the mergeable data stream in the host system 100 may be defined as the second data stream. The first region may include an SRAM, and the second region may include a multi-bit NAND flash memory, but the example embodiments of the inventive concepts are not limited thereto, and other forms of volatile and/or nonvolatile memory types may be used for the first and/or second memory regions. The second region may include previously zoned open block regions.

The storage device 220 may receive a command signal CMD and/or an address information request signal ADDR from the controller 210, and may exchange a data signal DATA with the controller 210 in response to the received command signal and/or the received address information request signal. The storage device 220 may receive a control signal CTRL from the controller 210, etc. For example, the storage device 220 may receive a control signal of designating a region for storing a data stream from the controller 210, store first data streams in the first region, and/or store second data streams in the second region, etc.

Components of the storage system 200 will now be described in detail with reference to FIGS. 6 and 7.

Figure 6:
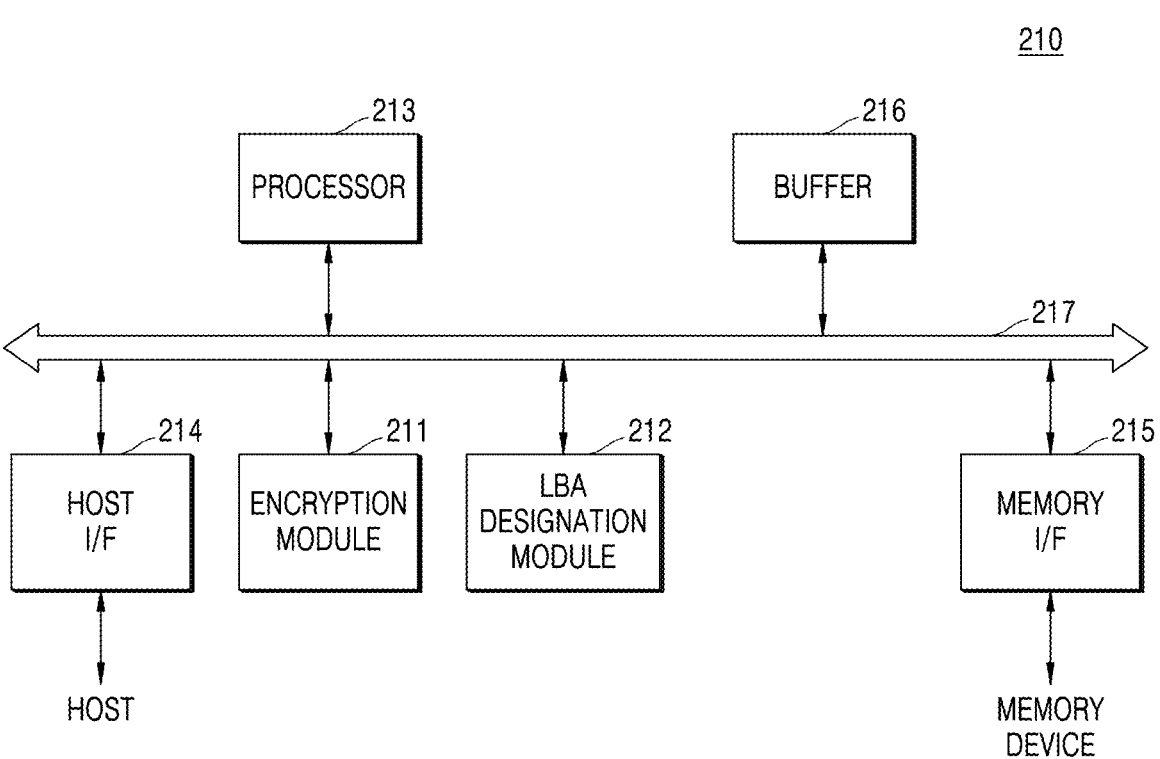
FIG. 6 is a block diagram of a controller according to at least one example embodiment.

FIG. 6 is a block diagram of the controller 210 according to at least one example embodiment.

Referring to FIG. 6, the controller 210 (e.g., processing circuitry, etc.) may include the encryption module 211 and the LBA designation module 212, and may further include at least one processor 213, a host interface (I/F) 214, a memory I/F 215, and/or a buffer 216, etc., but the example embodiments are not limited thereto, and for example, the controller 210 may include a greater or lesser number of constituent components.

The controller 210 may include the encryption module 211. The controller 210 according to at least one example embodiment may receive desired and/or preset information about a data stream from the host system 100, and may perform an encryption operation on the data stream. The encryption operation may be carried out for each data stream. The desired and/or preset information about the data stream may be encryption information input according to an Android operating system, but the example embodiments are not limited thereto.

The controller 210 may include the LBA designation module 212. The controller 210 according to at least one example embodiment may receive desired and/or preset LBA information from the host system 100, and may designate a region in which a data stream is stored. The storage region may be classified into a first region or a second region according to and/or based on the possibility of merging data streams, the first region may be defined as a region where an unmergeable data stream is stored, and the second region may be defined as a region where a mergeable data stream is stored, but is not limited thereto. An LBA may be determined in the data stream according to and/or based on open block region information of the storage device 220. The encryption module 211 and the LBA designation module 212 may be implemented as hardware or a combination of hardware and software, etc.

The processor 213 may include a central processing unit (CPU) and/or a micro-processor, etc., and may control an overall operation of the controller 210 by executing instructions stored in the buffer 216 and/or a memory (not shown).

The host I/F 214 may provide a physical connection between the host system 100 and the storage system 200. For example, the host I/F 214 may include various interface methods such as advanced technology attachment (ATA), serial ATA (SATA), external SATA (e-SATA), small computer small interface (SCSI), a serial attached SCSI (SAS), peripheral component interconnection (PCI), PCI express (PCI-E), IEEE 1394, a universal serial bus (USB), a secure digital (SD) card, a multi media card (MMC), an embedded multi media card (eMMC), a compact flash (CF) card interface, and/or a Non-Volatile Memory Express (NVMe), etc.

The host I/F 214 may transmit a variety of information to the host system 100 under the control by the processor 213 in an asynchronous manner or a synchronous manner. For example, the host interface 214 may transmit a variety of information to the host system 100 by generating an interrupt in a desired and/or preset region of the host system 100, and may be implemented in various methods such as MSI, MSI-X, pin based, and Advanced Error Reporting (AER), but is not limited thereto.

According to at least one example embodiment, the host I/F 214 may receive a write request from the host system 100, and may transmit a response signal corresponding to a write request to the host system 100. The host I/F 214 may transmit error generation information to the host system 100 in an asynchronous manner, but is not limited thereto. For example, the host I/F 214 may transmit, to the host system 100, asynchronous event information (AEI) indicating that a write error has occurred. The host I/F 214 may receive a request signal requesting information about an error from the host system 100, and may transmit write data in which a write error has occurred and information used for recovery to the host system 100. The host I/F 214 may receive a write request for recovering the write error from the host system 100.

The memory I/F 215 may provide at least one channel (e.g., lane, etc.) between the controller 210 and the storage device 220. For example, a command, an address, and/or data may be transmitted and/or received between the controller 210 and the storage device 220 via the memory I/F 215.

The buffer 216 may operate under the control by the processor 213, and a plurality of buffers 216 may be included, but is not limited thereto. For example, the buffer 216 may be implemented by a volatile memory, such as DRAM and/or SRAM, etc., and/or may be implemented by a non-volatile memory, such as PRAM and/or flash memory, etc. According to at least one example embodiment, the buffer 216 may temporarily store write data and a physical address received from the host system 100, etc., but is not limited thereto. Although the buffer 216 is included in the controller 210 in FIG. 6, the buffer 216 may be implemented as a separate component from the controller 210.

Each component of the controller 210 may transmit or receive signals through a physical and/or electrical connection line 217.

The storage system 200 according to at least one example embodiment may further include a memory (not shown). The memory may be implemented by a volatile memory and/or a non-volatile memory, like the buffer 216, and may be used as an operating memory, a buffer memory, a cache memory, or the like.

Figure 7:
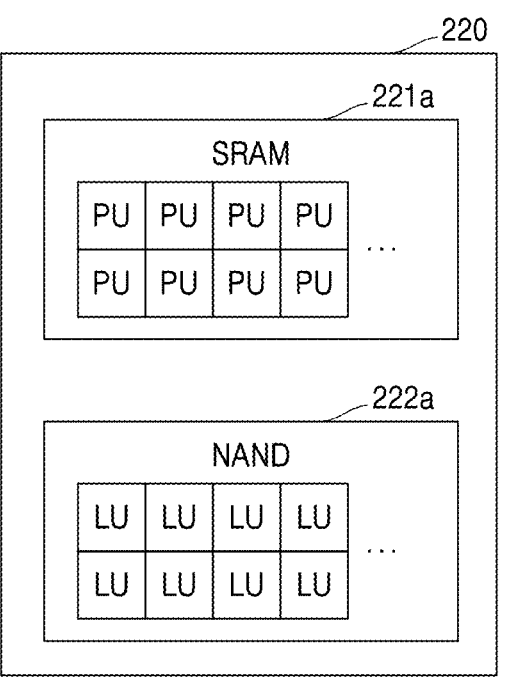
FIG. 7 is a block diagram of a structure of a storage device according to at least one example embodiment.

FIG. 7 is a block diagram of a structure of the storage device 220 according to at least one example embodiment.

Referring to FIG. 7, the storage device 220 according to at least one example embodiment includes a first region 221a to which at least one data stream unmergeable in the host system 100 is written. The storage device 220 also includes a second region 222a to which at least one data stream mergeable in the host system 100 is written. The data stream unmergeable in the host system 100 may be defined as the first data stream, and the data stream mergeable in the host system 100 may be defined as the second data stream.

According to at least one example embodiment, the first region 221a of the storage device 220 may be configured as an SRAM. A write operation may be performed on first data streams in the first region 221a, and the first data streams may be processed to have the same size as the desired and/or preset reference unit (e.g., a programmed unit (PU), etc.) and stored. For example, in response to the determination that merging of the split data streams in the host system 100 is undesired and/or impossible, etc., the host system 100 may define the unmergeable data streams as first data streams and may transmit the first data streams to the first region 221a of the storage device 220. The host system 100 waits until a sum of the sizes of pieces of data included in the first data streams satisfies the reference unit, and, in response to the sum of the sizes of the pieces of data of the first data streams satisfies the reference unit, may transmit the first data streams to the storage device 220, etc. In response to the first data streams satisfying the reference unit size, the storage device 220 may merge the first data streams while performing and/or directly performing a write operation within the first region 221*a*.

The second region 222*a* of the storage device 220 may be configured as a multi-bit NAND flash memory, but is not limited thereto. A write operation may be performed on second data streams in the second region 222*a*, and the second data streams may be data streams merged to the size of a desired and/or preset LU by the host system 100. For example, the host system 100 may determine whether the split data streams are mergeable, and, in response to the results of the determination indicating that the data streams are mergeable, the host system 100 may merge and/or directly merge the data streams to create and/or generate a second data stream corresponding to an LU. In response to the second data stream being created and/or generated, the host system 100 may control the storage device 220 to perform a write operation on the second data streams in the second region 222*a* of the storage device 220, etc.

The memory system 10 according to at least one example embodiment may previously process data by using the host system 100 and efficiently use the storage space of the storage device 220, by splitting and merging a data stream through the above-described process. An operation method of the memory system 10 will now be described in detail.

Figure 8:
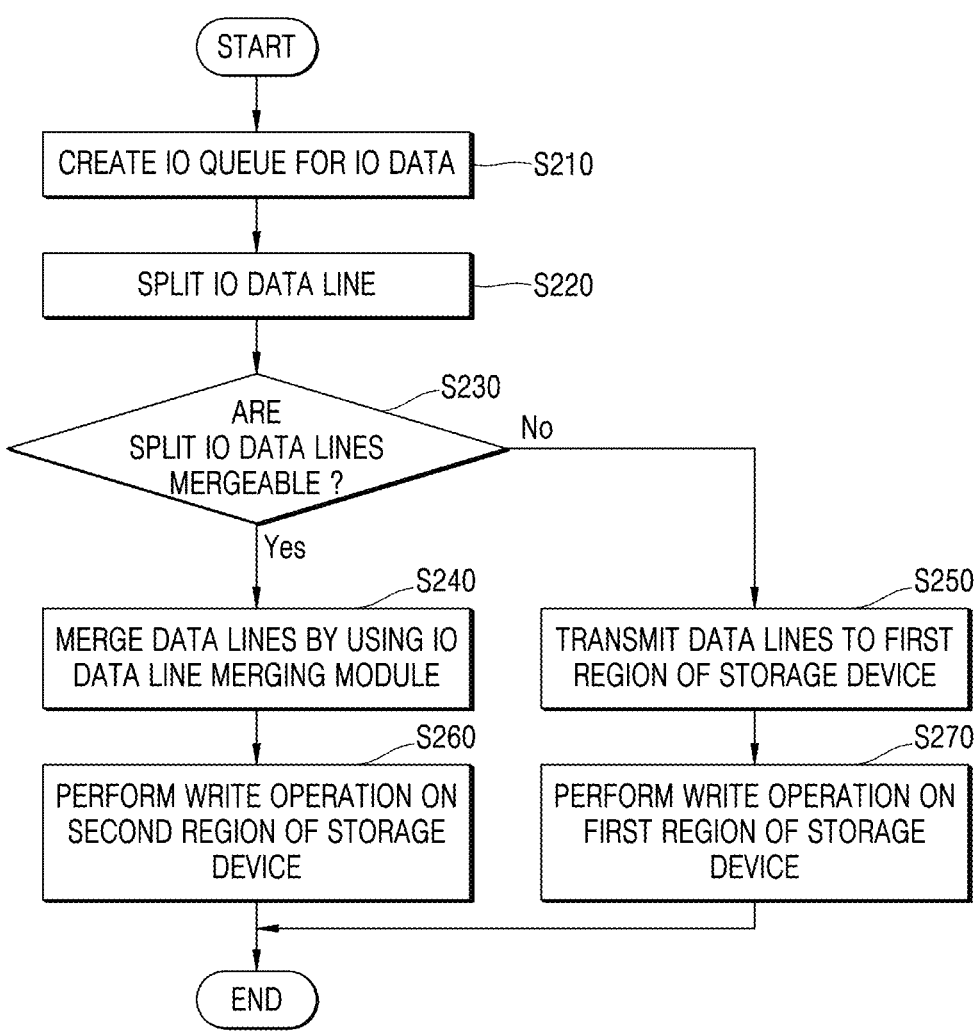
FIG. 8 is a flowchart of a data processing method according to at least one example embodiment.

FIG. 8 is a flowchart of a data processing method according to at least one example embodiment.

Referring to FIG. 8, the I/O queue management module 111 of the host system 100 creates and/or generates an IO Queue for IO data (S210). The size of the IO queue for the IO data may be determined based on the size of the open block area of the storage device 220.

In response to the IO queue being created and/or generated for the IO data, at least one data stream is split in accordance with the size of the IO queue (S220). The I/O splitting module 112 may generate split data streams (e.g., IO Splits) by tailoring (and/or splitting, dividing, etc.) the data streams extending over the boundary of the reference unit size to fit the reference unit.

In response to the IO data stream being split, the host system 100 determines whether the split IO data streams are mergeable (S230).

In response to the results of the determination indicating that the split IO data streams are mergeable, the host system 100 merges the data streams by using the IO data stream merging module 114 (S240). On the other hand, in response to the results of the determination indicating that the split IO data streams are unmergeable, the host system 100 transmits the data streams to the first region of the storage device 220 by using the IO data stream grouping module 113 (S250). The I/O grouping module 113 may group pieces of unmergeable data (IO) among the split data streams obtained by the I/O splitting module 112, and may transmit and/or directly transmit the grouped data pieces to the storage device 220, etc.

In response to the results of the determination indicating that the split IO data streams are mergeable, and the host system 100 merges the data streams by using the IO data stream merging module 114, the host system 100 may perform a write operation on the second region of the storage device 220 (S260). For example, the I/O merging module 114 may merge second data streams having smaller sizes than the desired and/or preset reference unit into one or more data streams each having the reference unit size. In response to the second data streams being merged into a data stream having the reference unit size, the I/O merging module 114 may transmit the merged second data stream to the storage device 220 of the storage system 200. The merged second data stream may be transmitted to the second region of the storage device 220, and the second region may be a multi-bit NAND flash memory region, but the example embodiments are not limited thereto. The second region may include a zoned logical unit region which was previously designated, but is not limited thereto. The storage device 220 may write the second data stream to the zoned logical unit region.

On the other hand, in response to the results of the determination indicating that the split IO data streams are unmergeable, and the host system 100 transmits the data streams to the first region of the storage device 220 by using the IO data stream grouping module 113, the storage device 220 may perform a write operation on the first region of the storage device 220 (S270). The host system 100 may wait for (and/or delay) transmission of first data streams until the first data streams satisfy the desired and/or preset reference unit, and, in response to the sum of the sizes of the first data streams satisfying the reference unit, the host system 100 may transmit the first data streams to the storage device 220. The storage device 220 may merge and/or directly merge the first data streams in the first region, but is not limited thereto.

Figure 9:
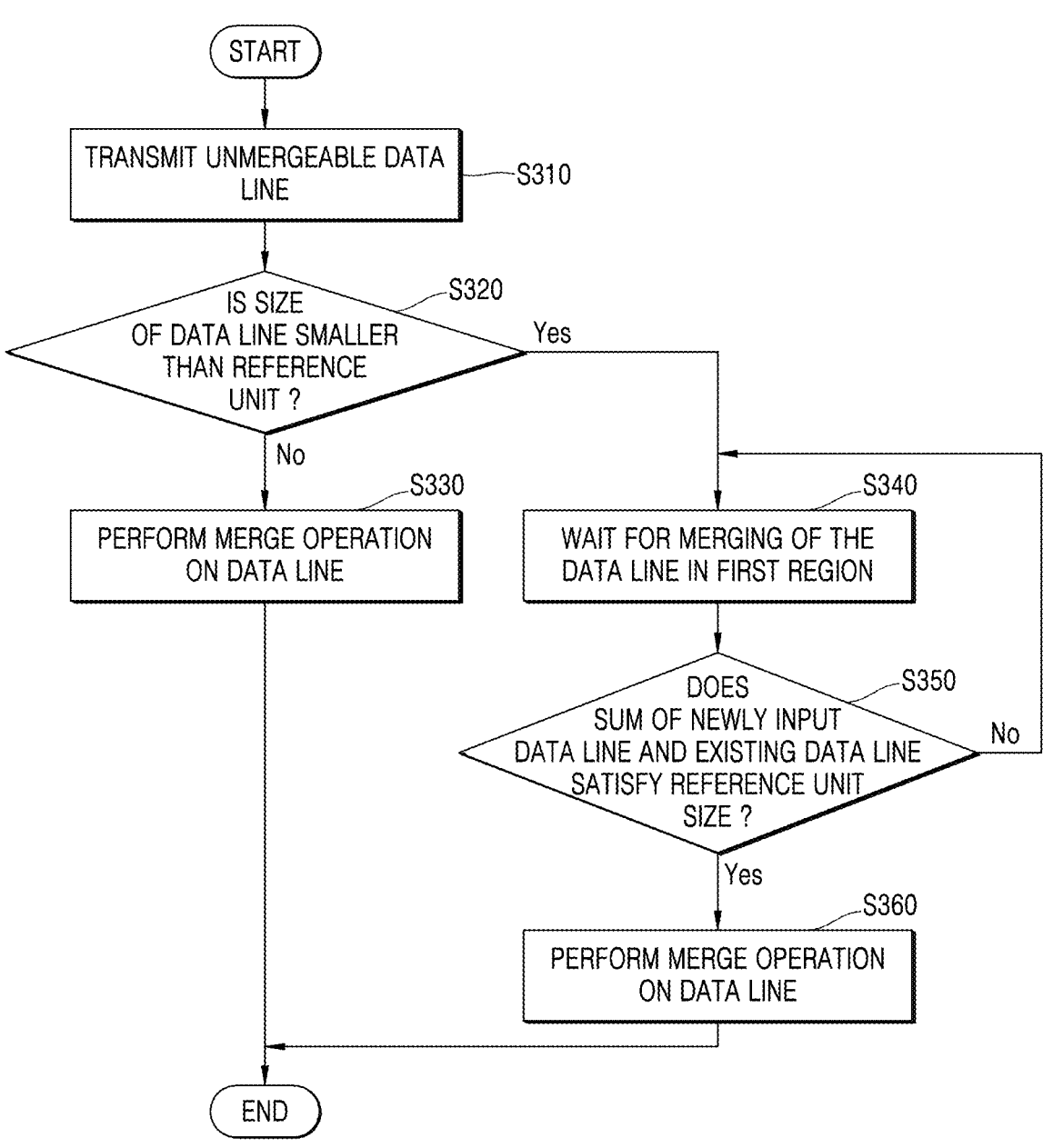
FIG. 9 is a flowchart of a process in which a memory system according to at least one example embodiment groups and merges data.

FIG. 9 is a flowchart of a process in which the memory system 10 according to at least one example embodiment groups and merges data.

Referring to FIG. 9, the host system 100 may transmit a data stream unmergeable within the host system 100 to the first region of the storage device 220 (S310).

In response to the unmergeable data stream within the host system 100 being transmitted to the first region of the storage device 220, the host system 100 determines whether the size of the data stream to be transmitted is smaller than the reference unit (S320).

In response to the results of the determination indicating that the size of the data stream to be transmitted is equal to or larger than the reference unit, the host system 100 transmits unmergeable data streams to the storage device 220, and the storage device 220 performs and/or directly performs a write operation on the data streams in the first region. The storage device 220 may perform a merging operation on the data streams while performing the write operation (S330), etc.

On the other hand, if the results of the determination indicates that the size of the data stream to be transmitted is smaller than the reference unit, the host system 100 waits for transmission of the data stream (e.g., delays transmission of the data stream), and consequently, the merging operation on the data streams in the first region enters a waiting state (S340) (e.g., delayed state, etc.).

In response to the write operation in the first region of the storage device 220 entering a waiting state, the host system 100 determines whether a sum of a newly input data stream and an existing data stream satisfies the reference unit size (S350).

In response to the results of the determination indicating that the sum of the newly input data column and the existing data column satisfies the reference unit size, the host system 100 transmits the data stream to the first region, and the storage device 220 performs and/or directly performs a merge operation on the data stream in the first region (S360).

On the other hand, if the results indicate that the sum of the newly input data column and the existing data column does not satisfy the reference unit size, the merge operation on the data stream in the first region is place into a waiting state (or continues to stay in the waiting state), and the host system 100 compares the sum of the newly input data stream and the existing data stream with the reference unit size.

Figure 10:
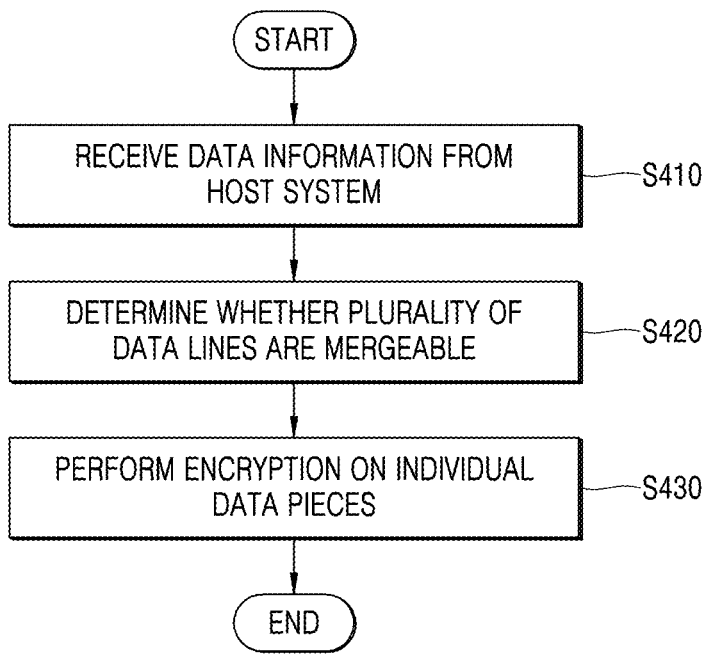
FIG. 10 is a flowchart of execution of encryption with respect to a data stream by a controller according to at least one example embodiment.

FIG. 10 is a flowchart of execution of encryption with respect to a data stream by the controller 210, according to at least one example embodiment.

Referring to FIG. 10, the controller 210 receives data information from the host system 100 (S410). The data information may be open block area information, encryption information, and/or LBA information of the storage device 220, but the example embodiments of the inventive concepts are not limited thereto.

In response to the data information, the controller 210 may determine whether a plurality of data streams are mergeable (S420). For example, the controller 210 may receive information about the mergeability of a data stream from the host system 100, and may analyze the information about the mergeability of the data stream to determine a store region for the received data stream. The controller 210 according to at least one example embodiment may define data streams unmergeable in the host system 100 as first data streams, and may determine a storage region for the first data streams to be a first region. The controller 210 may define data streams mergeable in the host system 100 as second data streams, and may determine a storage region for the second data streams to be a second region.

The controller 210 may perform encryption on individual data pieces (S430). For example, the controller 210 according to at least one example embodiment may receive desired and/or preset information about a data stream from the host system 100, and may perform an encryption operation on the data stream. The encryption operation may be carried out for each data stream, but is not limited thereto. The desired and/or preset information about the data stream may be encryption information input according to an Android operating system, etc., but the example embodiments are not limited thereto.

Figure 11:
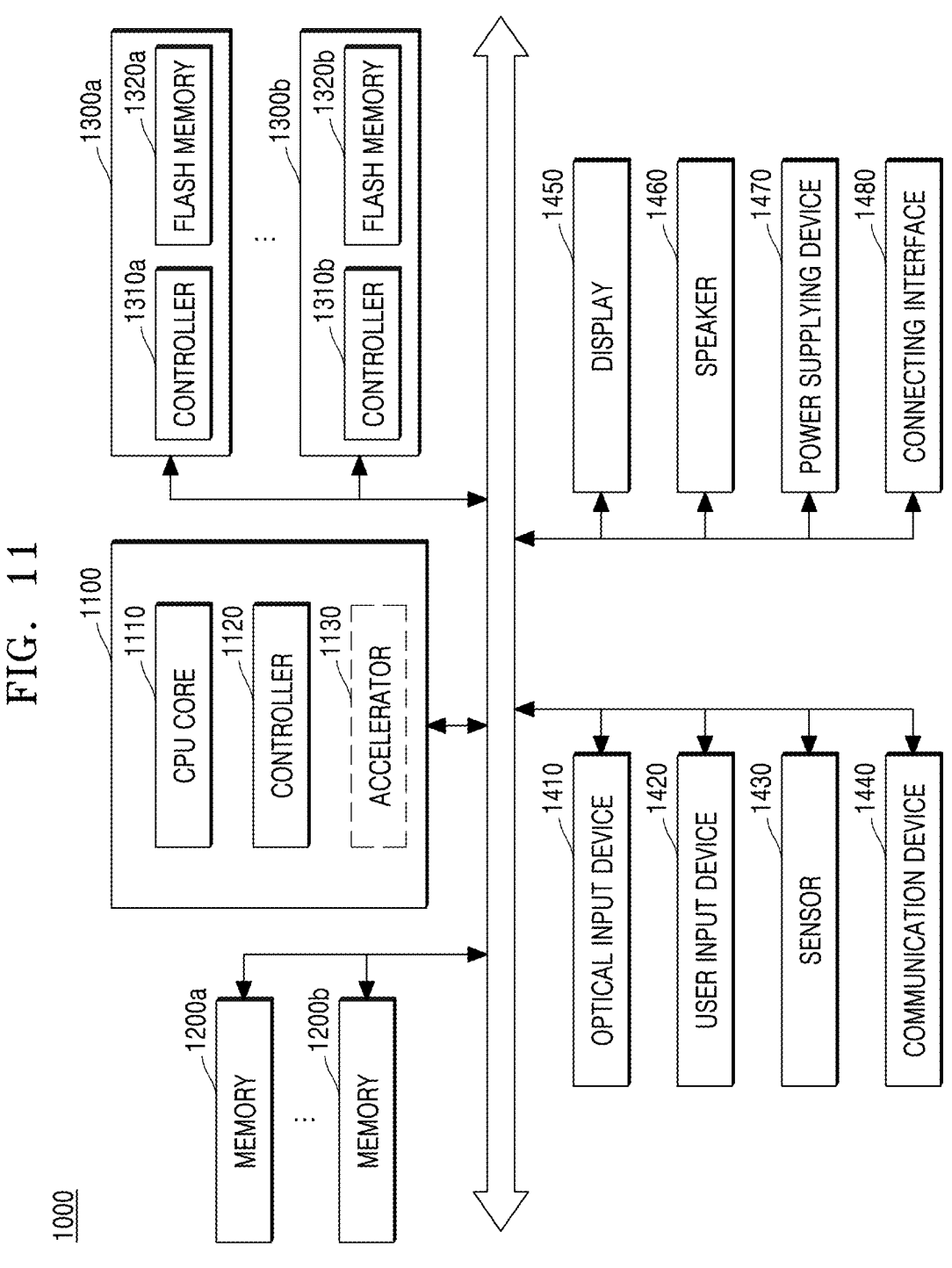
FIG. 11 is a block diagram of a system to which a storage device according to at least one example embodiment has been applied.

FIG. 11 is a block diagram of a system 1000 to which a storage device according to at least one example embodiment has been applied.

Referring to FIG. 11, the system 1000 may be a mobile system, such as a mobile phone, a smartphone, a tablet, a laptop computer, a wearable device, a health care device, and/or an Internet of Things (IOT) device, etc. However, the system 1000 of FIG. 11 is not necessarily limited to the mobile system, and may be a personal computer (PC), a server, a media player, and/or automotive equipment, such as a navigation device, etc.

Referring to FIG. 11, the system 1000 may include at least one main processor 1100, memories 1200a and 1200b, and/or storage devices 1300a and 1300b, etc., and may further include one or more of an image capturing device 1410, a user input device 1420, a sensor 1430, a communication device 1440, a display 1450, a speaker 1460, a power supplying device 1470, and/or a connecting interface 1480, etc.

The main processor 1100 may control the overall operation of the system 1000, and more particularly, operations of other components constituting the system 1000. The main processor 1100 may be implemented as a general-purpose processor loaded with special purpose computer readable instructions implementing one or more of the methods of the example embodiments, a dedicated processor, a special purpose processor, an application processor (AP), or the like.

The main processor 1100 may include one or more CPU cores 1110, and may further include at least one controller 1120 for controlling the memories 1200a and 1200b and/or the storage devices 1300a and 1300b, etc. According to at least one example embodiment, the main processor 1100 may further include an accelerator block 1130 which is a dedicated circuit for a high-speed data operation, such as an artificial intelligence (AI) data operation, etc., but is not limited thereto. The accelerator block 1130 may include a graphics processing unit (GPU), a neural processing unit (NPU), and/or a data processing unit (DPU), etc., and may be implemented as a separate chip physically independent from other components of the main processor 1100, but is not limited thereto.

The memories 1200a and 1200b may be used as a main memory device of the system 1000, and may include volatile memories, such as SRAM and/or DRAM, etc., and may include non-volatile memories, such as flash memory, PRAM, and/or RRAM, etc. The memories 1200a and 1200b may be implemented together with the main processor 1100 in the same package, but is not limited thereto.

The storage devices 1300a and 1300b may function as non-volatile storage devices that store data regardless of whether power is supplied or not, and may have a larger and/or relatively larger storage capacity than the memories 1200a and 1200b, but is not limited thereto.

The storage devices 1300a and 1300b may include storage controllers 1310a and 1310b and non-volatile memories (NVMs) 1320a and 1320b for storing data under the control by the storage controllers 1310a and 1310b. The NVMs 1320a and 1320b may include NAND flash memories, but may include other types of NVMs such as PRAM and/or RRAM, etc.

The storage devices 1300a and 1300b may be included in the system 1000 in a state of being physically separated from the main processor 1100, or may be implemented together with the main processor 1100 in the same package. The storage devices 1300a and 1300b have the same shape as a memory card, and thus may be detachably coupled to other components of the system 1000 through an interface such as the connecting interface 1480, which will be described later. The storage devices 1300a and 1300b may be devices to which a standard protocol such as a UFS, etc., is applied. For example, the storage devices 1300a and 1300b may correspond to UFS cards, but are not limited thereto.

The image capturing device 1410 may capture a still image and/or a moving picture, and may be a camera, a camcorder, and/or a webcam, etc.

The user input device 1420 may receive various types of data input from a user of the system 1000, and may be a touch pad, a keypad, a keyboard, a mouse, and/or a microphone, etc.

The sensor 1430 may detect various types of physical quantities that may be obtained from the outside of the system 1000, and may convert the sensed physical quantities into electrical signals. The sensor 1430 may be a temperature sensor, a pressure sensor, an illuminance sensor, a position sensor, an acceleration sensor, a biosensor, and/or a gyroscope sensor, etc.

The communication device 1440 may transmit and receive signals to and/or from other devices outside (e.g., external to) the system 1000 according to various communication protocols. The communication device 1440 may be implemented by including an antenna, a transceiver, and/or a MODEM, etc.

The display 1450 and the speaker 1460 may function as output devices that respectively output visual information and auditory information to a user of the system 1000.

The power supplying device 1470 may appropriately convert power supplied from a battery (not shown) built into the system 1000 and/or an external power source, and may supply a result of the conversion to each component of the system 1000.

The connecting interface 1480 may provide a connection between the system 1000 and at least one external device connected to the system 1000 to exchange data with the system 1000. The connecting interface 1480 may be implemented in various interface methods, such as ATA, SATA, e-SATA, an SCSI, an SAS, PCI, PCIe, NVMe, IEEE 1394, a USB, an SD card, an MMC, an eMMC, a UFS, an embedded Universal Flash Storage (eUFS), and/or a CF card interface, etc.

Figure 12:
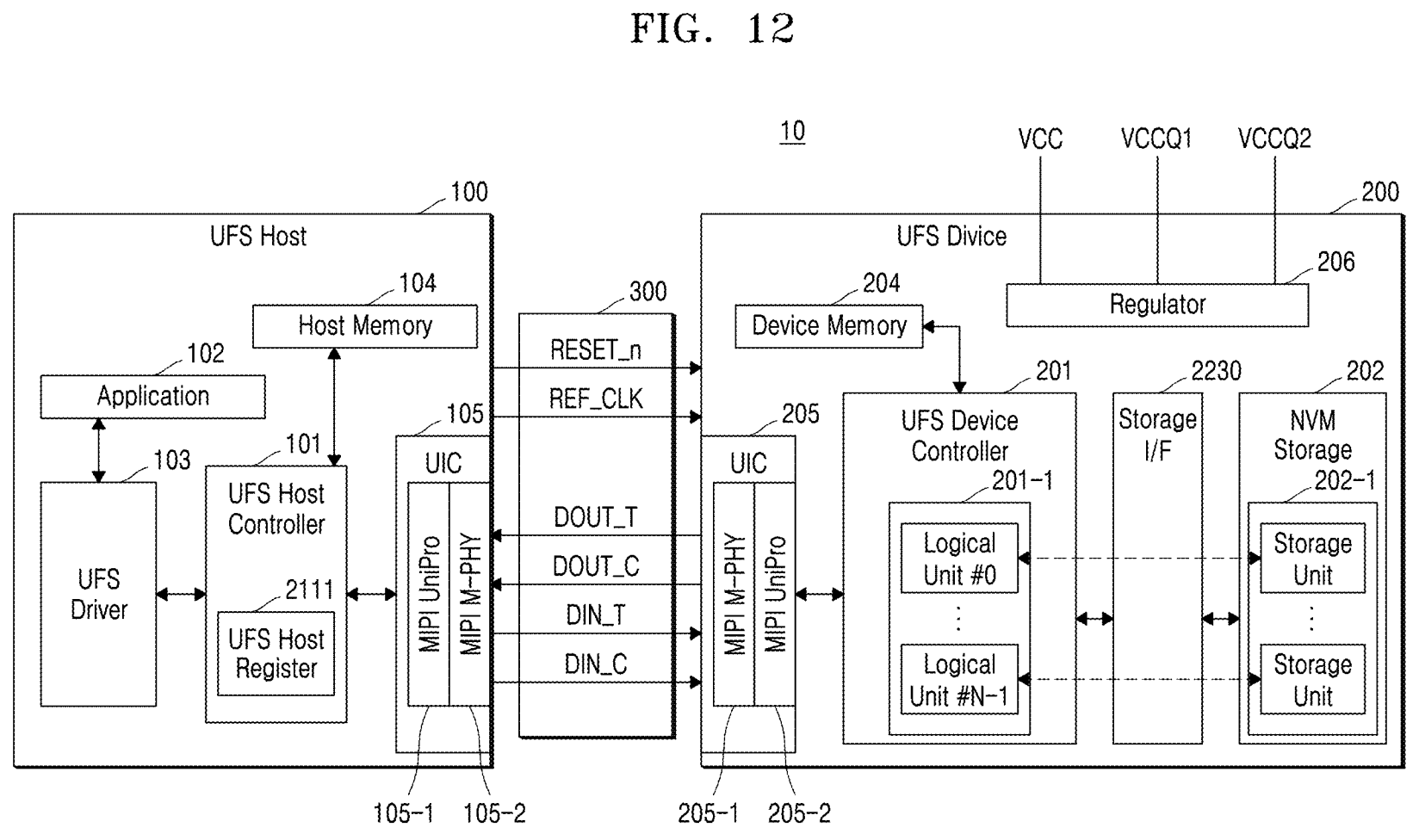

FIG. 12 is a block diagram for describing a UFS system 10 according to at least one example embodiment.

The UFS system 10 is a system conforming to the UFS standard announced by the Joint Electron Device Engineering Council (JEDEC), and may include a UFS host 100, a UFS device 200, and/or a UFS I/F 300, etc. The above description of the system 1000 of FIG. 11 is also applicable to the UFS system 10 of FIG. 12 within a range not in conflict with the description below with respect to FIG. 12.

Referring to FIG. 12, the UFS host 100 and the UFS device 200 may be connected to each other via the UFS I/F 300. When the main processor 1100 of FIG. 11 is an AP, the UFS host 100 may be implemented as a portion of the AP, but the example embodiments are not limited thereto.

The UFS host 100 may include a UFS host controller 101, an application 102 (e.g., at least software application, etc.), a UFS driver 103, a memory 104, and/or a UFS interconnect (UIC) layer 105, etc., but is not limited thereto. In this case, the UFS host controller 101 and the memory 104 may correspond to the controller 1120 of the main processor 1100 of FIG. 11, and the memories 1200_a_ and 1200_b_ and the storage devices 1300_a_ and 1300_b_ of FIG. 11, respectively, but the example embodiments are not limited thereto.

The UFS device 200 may include a UFS device controller 201, a storage 202, a storage I/F 203, a memory 204, and/or an UIC layer 205, etc. The storage 202 may be configured as a plurality of NVM units and/or devices, but the example embodiments are not limited thereto.

The application 102 may refer to a program which communicates with the UFS device 200 in order to use the functions of the UFS device 200. The application 102 may transmit an input-output request (IOR) to the UFS driver 103 in order to achieve an input/output for the UFS device 200, etc. The IOR may refer to a read request, a write request, and/or a discard request of data, etc., but the example embodiments of the inventive concepts are not limited thereto.

The UFS driver 103 may manage the UFS host controller 101 through a host controller interface (UFS-HCI). The UFS driver 103 may convert the IOR generated by the application 102 into a UFS command defined by the UFS standard, and may transmit the UFS command to the UFS host controller 101. One IOR may be converted into a plurality of UFS commands. A UFS command may be a command defined by the SCSI standard, but may also be a command dedicated to the UFS standard, etc.

The UFS host controller 101 may transmit the UFS command obtained by the UFS driver 103 to the UIC layer 205 of the UFS device 200 via the UIC layer 105 of the UFS host 100 and the UFS I/F 300. In this process, a UFS host register 2111 of the UFS host controller 101 may serve as a command queue (CQ), but is not limited thereto.

The UIC layer 105 on the UFS host 100's side may include an MIPI UniPro 105-1 and an MIPI M-PHY 105-2, etc., and the UIC layer 205 on the UFS device 200's side may also include an MIPI M-PHY 205-1 and an MIPI UniPro 205-2, etc.

The UFS I/F 300 may include at least one lane, line and/or port for transmitting a reference clock REF_CLK, a lane, line and/or port for transmitting a hardware reset signal RESET_n for the UFS device 200, and a pair of lanes, lines and/or ports for transmitting a pair of differential input signals DIN_t and DIN_c, and a pair of lanes, lines and/or ports for transmitting a pair of differential output signals DOUT_t and DOUT_c, etc.

The frequency value of at least one reference clock provided from the UFS host 100 to the UFS device 200 may be one of four values of 19.2 MHZ, 26 MHz, 38.4 MHZ, and 52 MHZ, but the example embodiments of the inventive concepts are not limited thereto.

The UFS host 100 may change the frequency value of the reference clock even while operating, that is, while data transmission/reception is performed between the UFS host 100 and the UFS device 200. The UFS device 200 may generate clocks of various frequencies from the reference clock provided from the UFS host 100 by using a phase-locked loop (PLL) or the like.

The UFS I/F 300 may support a plurality of lanes, and each lane may be implemented as a differential pair. For example, the UFS I/F 300 may include at least one receive lane and at least one transmit lane, the pair of lines for transmitting the pair of differential input signals DIN_t and DIN_c may correspond to the receive lane, and the pair of lines for transmitting the pair of differential output signals DOUT_t and DOUT_c may correspond to the transmit lane, etc.

The at least one receive lane and the at least one transmit lane may transmit data in a serial communication manner, and full-duplex communication may be possible between the UFS host 100 and the UFS device 200, based on a structure in which the at least one receive lane is separated from the at least one transmit lane, but the example embodiments are not limited thereto.

When at least one command from the UFS host 100 is input (e.g., transmitted) to the UFS device 200 via the UIC layer 205, the UFS device controller 201 may perform an operation according to the input command, and, in response to the operation being completed, the UFS device controller 201 may transmit a completion response to the UFS host 100.

For example, when the input command is a write command, the UFS device controller 201 may temporarily store write data received from the UFS host 100 in the memory 204, but is not limited thereto. The UFS device controller 201 may store the write data temporarily stored in the memory 204, at a selected location of the NVM block, through the storage I/F 203.

The UFS device controller 201 may manage the storage 202 through an LU, which is a logical data storage unit, but is not limited thereto. The number of LUs may be, but is not limited to, 8.

The UFS device controller 201 may include at least one flash translation layer (FTL), and may convert a logical data address, for example, an LBA, received from the UFS host 100 into a physical data address, for example, a physical block address (PBA), by using the FTL, etc. In the UFS system 10, the desired and/or minimum size of a logical block for storing user data may be set to be 4 Kbytes, but is not limited thereto.

The UFS device controller 201 may further include a data flow analysis module 201-1. In the data flow analysis module 201-1, the UFS device 200 may independently identify the amount of transmission/reception data, and, based on this identified amount, may deactivate some lanes among one or more bidirectional lanes and/or may determine and/or select an operation mode of the one or more bidirectional lanes.

According to at least one example embodiment, the data flow analysis module 201-1 may compare the size of data received by the UFS device 200 with the size of data transmitted to the UFS host 100, and may determine whether to switch the operation mode of the one or more bidirectional lanes based on a result of the comparison. For example, when a ratio of the size of data transmitted to the UFS host 100 to the size of data received by the UFS device 200 exceeds a desired and/or predefined threshold, the data flow analysis module 201-1 may transmit, to the UFS host 100, a signal requesting the UFS host 100 to switch the operation mode of at least one bidirectional lane to a transmission mode, and/or may transmit, to the UFS host 100, a control signal instructing the UFS device 200 to switch the operation mode of at least one bidirectional lane to the transmission mode.

When the UFS device 200 transmits a control signal instructing switching of the operation mode for at least one bidirectional lane to the UFS host 100, the UFS device 200 may correspond to a UFS local device, and the UFS host 100 may correspond to a UFS remote device. The control signal instructing switching of the operation mode, which is output by the UFS device 200, may correspond to a PACP_SE-T_req signal, but is not limited thereto.

According to another example embodiment, the data flow analysis module 201-1 may periodically request the UFS host 100 for data flow analysis information at every desired and/or predefined time (e.g., at periodic intervals), but the example embodiments are not limited thereto. When the data flow analysis module 201-1 compares and/or directly compares the size of data transmitted and received based on the UFS device 200, this may cause performance degradation, such as degradation of an input/output device of the UFS device 200, etc., and accordingly becomes a larger load on the UFS device 200. In response to the request received from the data flow analysis module 201-1 of the UFS device controller 201, the application 102 of the UFS host 100 may transmit, to the UFS device controller 201, data flow analysis information such as a ratio and/or a size of transmission/reception data, etc., between the UFS host 100 and the UFS device 200, but the example embodiments are not limited thereto. The data flow analysis module 201 may request the UFS host 100 to switch the operation mode of at least one bidirectional lane, and/or may output a control signal directly instructing the UFS device 200 to switch the operation mode of the at least one bidirectional lane, based on the received data flow analysis information.

The UFS host 100 may sequentially store commands to be transmitted to the UFS device 200 in the UFS host register 2111 capable of functioning as a command queue, and may sequentially transmit the commands to the UFS device 200, but is not limited thereto. At this time, even when a previously transmitted command is still being processed by the UFS device 200, that is, even when a notification that the previously transmitted command has been processed by the UFS device 200 has not been received, the UFS host 100 may transmit a next command waiting in a command queue to the UFS device 200, and accordingly, the UFS device 200 may also receive the next command from the UFS host 100 while processing the previously transmitted command, etc. The maximum number (queue depth) of commands that may be stored in the command queue may be, for example, 32, but the example embodiments are not limited thereto. The command queue may be implemented as a circular queue type that indicates the start and end of a command sequence stored in a queue, respectively, through a head pointer and a tail pointer, but is not limited thereto.

Each of a plurality of memory units 202-1 through 202-N may include a memory cell array and/or a control circuit for controlling an operation of the memory cell array, etc. The memory cell array may include a two-dimensional memory cell array and/or a three-dimensional memory cell array. The memory cell array includes a plurality of memory cells, each of which may be a cell storing one bit of information (single level cell (SLC)), but may also be a cell which stores information of 2 or more bits, such as a multi level cell (MLC), a triple level cell (TLC), or a Quadruple Level Cell (QLC), etc. The three-dimensional memory cell array may include vertical NAND strings that are vertically oriented such that at least one memory cell is positioned on top of another memory cell.

VCC, VCCQ, VCCQ2, etc., may be input as a power supply voltage to the UFS device 200. VCC, which is a main power voltage for the UFS device 200, may have a value of 2.4 to 3.6V, but is not limited thereto. VCCQ, which is a power supply voltage for supplying a low-range voltage, is mainly for the UFS device controller 201, and may have a value of 1.14 to 1.26V, but is not limited thereto. VCCQ2, which is a power supply voltage for supplying a voltage lower than VCC but higher than VCCQ, is mainly for input/output interfaces such as MIPI M-PHY, etc., and may have a value of 1.7 to 1.95V, but is not limited thereto. The power voltages may be supplied for each component of the UFS device 200 via a regulator 206.

Various example embodiments to which a memory system according to at least one example embodiment is applicable will now be described in more detail.

Figure 13:
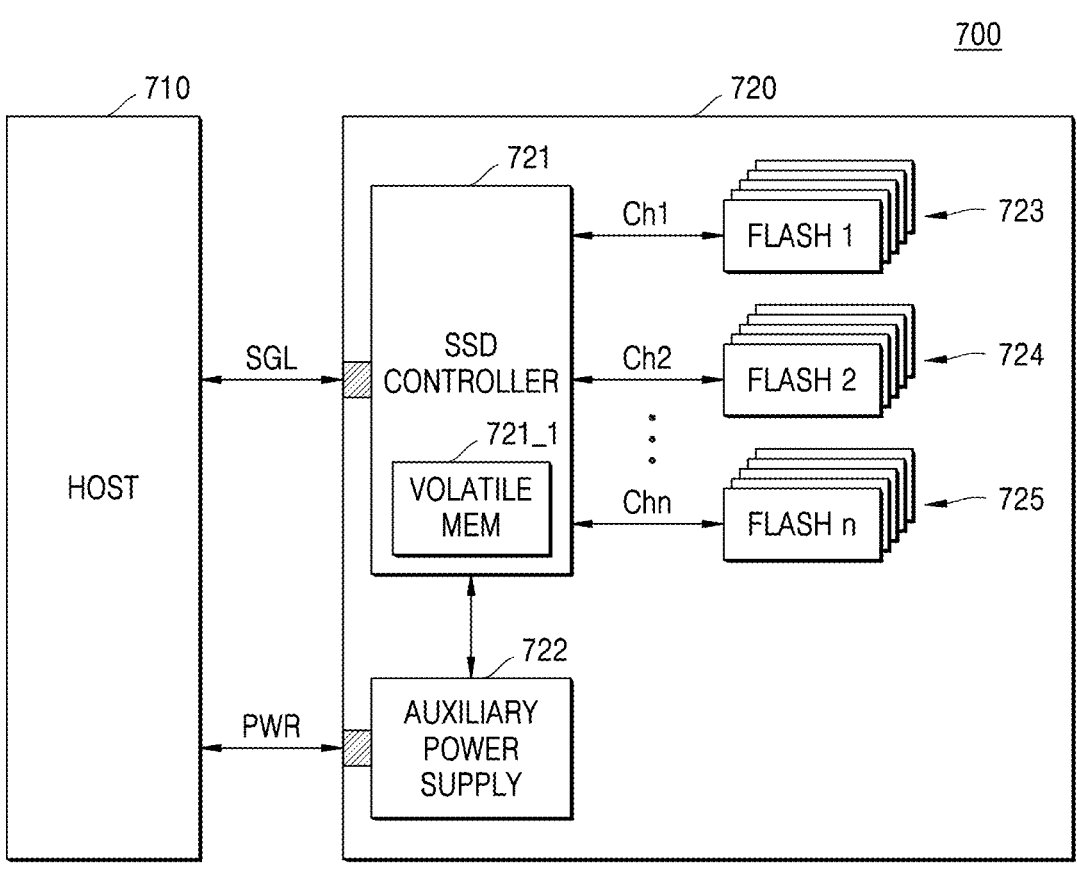
FIGS. 13 and 14 are block diagrams illustrating an example where blocks are allocated to a storage region in an SSD including a plurality of storage media according to at least one example embodiment.
Figure 14:
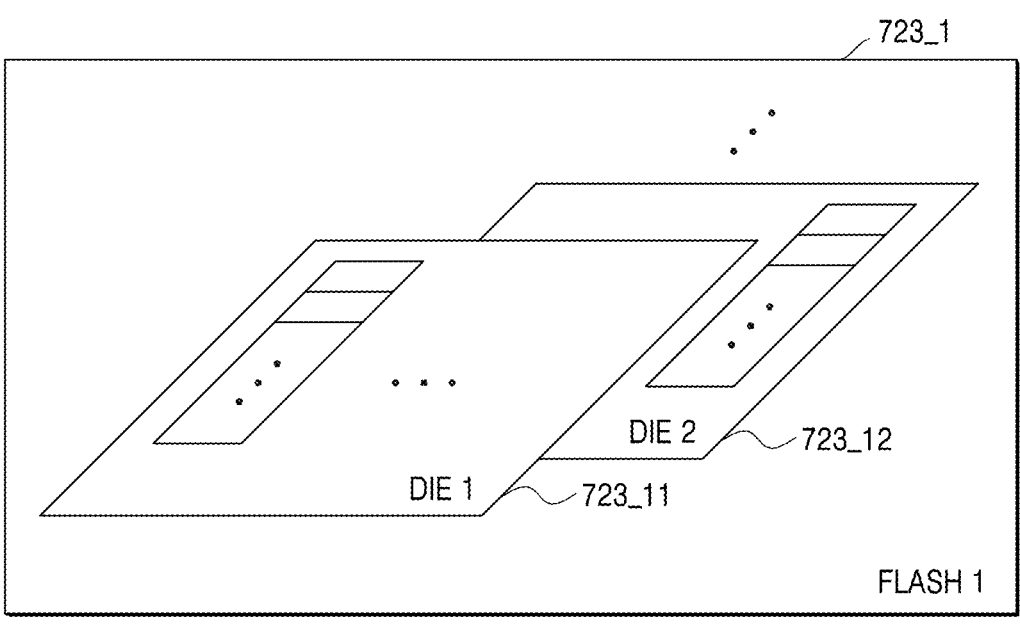

FIGS. 13 and 14 are block diagrams illustrating an example where blocks are allocated to a storage region in an SSD including a plurality of storage mediums according to some example embodiments.

Referring to FIG. 13, a data processing system 700 may include a host system 710 and/or an SSD 720, etc., but is not limited thereto. The SSD 720 may correspond to an open channel SSD according to at least one example embodiment, transmits and/or receives signals to and/or from the host system 710 through a signal connector SGL, and receives power through a power connector PWR, etc. The SSD 720 may include an SSD controller 721, an auxiliary power supply 722, and/or a plurality of memory systems, e.g., memory systems 723, 724, and/or 725, etc. Each of the plurality of memory systems 723, 724, and 725 may include one or more flash memory devices as a storage device, but the example embodiments are not limited thereto. Each of the flash memory devices may include one or more dies DIE, and one or more blocks may be provided in each of the dies DIE.

According to some example embodiments, the controller 721 may communicate with the plurality of memory systems 723, 724, and 725 through a plurality of channels Ch1 through Chn, and may perform a management operation on blocks storing data in the SSD 720, etc. Information associated with a block map may be generated through a management operation performed on the blocks, and the information associated with the block map may be stored (e.g., arbitrarily stored, etc.) in a volatile memory 721_1 of the controller 721, and/or may be non-volatilely stored in the plurality of memory systems 723, 724, and 725, etc. The controller 721 may include a bad block manager (not shown) for performing a management operation on blocks storing data, and the bad block manager may be implemented based on hardware or a combination of hardware and software.

FIG. 14 illustrates a block selection example according to at least one example embodiment, and, for example, a first flash memory device Flash 1 is illustrated as one flash memory device connected to a first channel Ch1. The first flash memory device Flash 1 includes a plurality of dies (DIEs), and a first DIE 723_11 and a second DIE 723_12 among the plurality of dies are illustrated, but the example embodiments are not limited thereto. Each of the first DIE and the second DIE may include a plurality of blocks.

Figure 15:
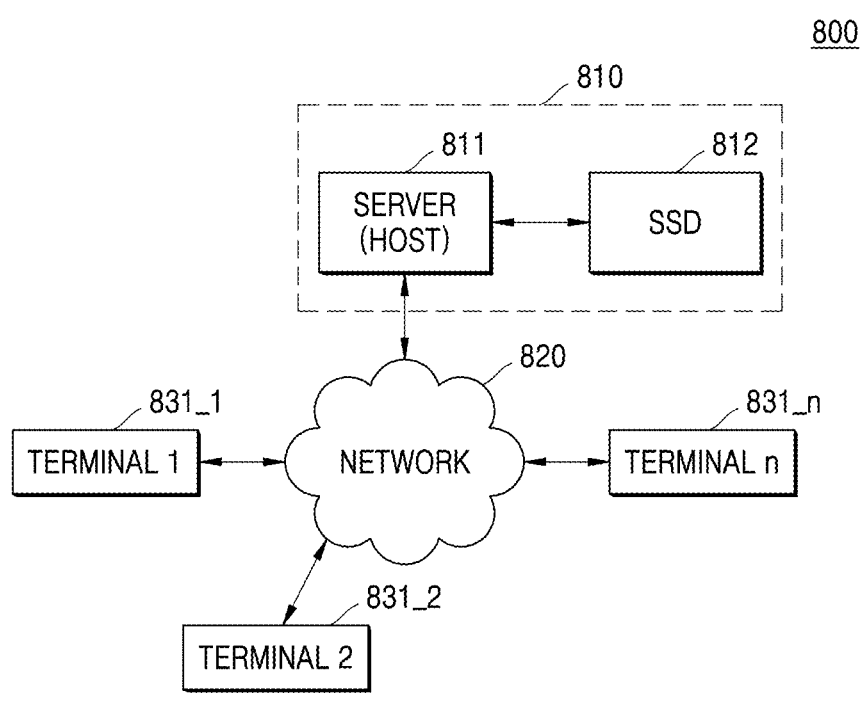
FIG. 15 is a block diagram of a network system including a server system according to at least one example embodiment.

FIG. 15 is a block diagram of a network system including a server system according to at least one example embodiment.

Referring to FIG. 15, a network system 800 may include a server system 810, and may also include a plurality of terminals 831_1 through 831_*n* communicating with each other via at least one network 820, etc., but the example embodiments are not limited thereto. The server system 810 may include at least one server 811, and at least one SSD 812 as a storage system, etc. The server 811 may perform a function of a host system according to one or more of the above-described example embodiments.

The server 811 may process a plurality of requests transmitted from the plurality of terminals 831_1 through 831_*n* connected to the network 820. For example, the server 811 may store, in the SSD 812, data provided from the plurality of terminals 831_1 through 831_*n*, but is not limited thereto. In storing data in the SSD 812, data may be stored in the SSD 812, so as to manage the SSD 812, etc. According to one or more example embodiments, the server 811 may issue a request, to the SSD 812, to allocate a block for storing the data, and the SSD 812 may perform allocation on blocks storing the data, may perform a bad block determination operation, and/or may perform a management operation on the allocated blocks, etc. Also, an error repair operation for enhancing the reliability of the data may be applied.

While various example embodiments of the inventive concepts have been particularly shown and described, it will be understood that various changes in form and details may be made therein without departing from the spirit and scope of the following claims.

What is claimed is:

1. A memory system, the memory system comprising:
a host system configured to,
    split at least one data stream into a plurality of split data streams,
    determine whether the plurality of split data streams are mergeable in the host system based on a mergeability condition associated with each split data stream of the plurality of split data streams, the mergeability condition indicating whether a respective split data stream of the plurality of split data streams can be split into a plurality of smaller data streams or not,
    group at least one unmergeable first data stream among the plurality of split data streams, and merge at least one mergeable second data stream among the plurality of split data streams;
a storage device comprising at least one volatile memory device and at least one non-volatile memory device, the storage device including at least one first region and at least one second region, the at least one first region corresponding to the at least one volatile memory device, and the at least one second region corresponding to the at least one non-volatile memory device; and
processing circuitry configured to,
    receive at least one request to allocate at least one storage region for the at least one data stream from the host system,
    store all data blocks associated with the at least one first data stream in the at least one first region, and
    store all data blocks associated with the at least one second data stream in the at least one second region.

2. The memory system of claim 1, wherein the host system is further configured to:
generate a data queue corresponding to an open area in a free storage region of the storage device, the open area being an area in which data writing is permitted;
store the at least one data stream in the data queue; and
split data blocks associated with the at least one data stream in the data queue to generate the at least one split data stream.

3. The memory system of claim 1, wherein the host system is further configured to split the at least one first data stream and the at least one second data stream based on a desired reference data size.

4. The memory system of claim 3, wherein
the host system is further configured to transmit, to the at least one first region, a plurality of data streams having sizes smaller than the desired reference data size among the at least one first data stream, and transmit a merge request to the storage device, the merge request causing the storage device to merge the plurality of data streams having sizes smaller than the desired reference data size, and store the merged data stream in the at least one first region; and
the at least one first region is allocated on the at least one volatile memory device.

5. The memory system of claim 4, wherein the host system is further configured to:
determine whether a total size of the at least one first data stream is less than the desired reference data size; and
delay transmission of the at least one first data stream to the at least one first region until the total size of the at least one first data stream satisfies the desired reference data size.

6. The memory system of claim 3, wherein the host system is further configured to:
merge one or more second data streams among the at least one second data stream having smaller sizes than the desired reference data size into one data stream; and
transmit the merged second data stream to the storage device, the storage device configured to store the merged second data stream in the at least one second region, the at least one second region being allocated on the at least one non-volatile memory device.

7. The memory system of claim 1, wherein the processing circuitry is further configured to encrypt the at least one first data stream and the at least one second data stream.

8. The memory system of claim 1, wherein
the host system is further configured to tailor the at least one first data stream and the at least one second data stream based on the mergeability condition for determining whether the at least one first data stream and the at least one second data stream are mergeable; and the processing circuitry is further configured to receive, from the host system, the mergeability condition associated with the at least one first data stream and the at least one second data stream.

9. A host system comprising:

memory having computer readable instructions stored thereon; and processing circuitry configured to execute the computer readable instructions to cause the host system to, split a data stream into a plurality of split data streams;

determine whether the plurality of split data streams are mergeable in the host system based on a mergeability condition associated with each split data stream of the plurality of split data streams, the mergeability condition indicating whether a respective split data stream of the plurality of split data streams can be split into a plurality of smaller data streams or not;

group unmergeable first data streams among the plurality of split data streams;

merge mergeable second data streams among the plurality of split data streams; and control at least one storage device to, store all of the grouped first data streams in a first region of the at least one storage device corresponding to at least one volatile memory device included in the at least one storage device, and store all of the merged second data streams in a second region corresponding to at least one non-volatile memory device included in the at least one storage device.

10. The host system of claim 9, wherein the host system is further caused to:

generate a data queue in an open area in a free storage region of the at least one storage device, the open area being an area in which data writing is permitted;

store the data stream in the data queue; and split data blocks associated with the data stream in the data queue to generate the plurality of split data streams.

11. The host system of claim 9, wherein the host system is further caused to:

split the first data streams and the second data streams based on a desired reference data size.

12. The host system of claim 11, wherein the host system is further caused to, transmit, to the first region, data streams having sizes smaller than the desired reference data size among the first data streams, and transmit a merge request to the at least one storage device, the merge request causing the at least one storage device to merge the data streams having sizes smaller than the desired reference data size and store the merged data streams in the first region; and the first region is allocated on the at least one volatile memory device.

13. The host system of claim 12, wherein the host system is further caused to:

determine whether a total size of the first data streams is less than the desired reference data size; and delay transmission of the first data streams to the first region until the total size of the first data streams satisfies the desired reference data size.

14. The host system of claim 11, wherein the host system is further caused to:

merge second data streams having smaller sizes than the desired reference data size into one data stream; and transmit the merged second data stream to the at least one storage device, the at least one storage device being caused to store the merged second data stream in the second region, the second region being allocated on the at least one non-volatile memory device.

15. An operation method of a memory system, the operation method comprising:

splitting, in a host system, a data stream into a plurality of split data streams;

determining whether the plurality of split data streams are mergeable in the host system based on a mergeability condition associated with each split data stream of the plurality of split data streams, the mergeability condition indicating whether a respective split data stream of the plurality of split data streams can be split into a plurality of smaller data streams or not;

grouping, in the host system, all unmergeable first data streams among the plurality of split data streams;

merging, in the host system, all mergeable second data streams among the plurality of split data streams;

transmitting a request to allocate at least two storage regions to a storage device, the storage device including at least one volatile memory device and at least one non-volatile memory device, the at least two storage regions including a first region and a second region, the first region corresponding to the at least one volatile memory device, and the second region corresponding to the at least one non-volatile memory device; and transmitting the grouped first data streams and the merged second data streams to the storage device, the transmitting causing the storage device to store the grouped first data streams in the first region, and store the merged second data streams in the second region.

16. The operation method of claim 15, wherein the method further comprises:

generating a data queue corresponding to an open area in a free storage region of the storage device, the open area being an area in which data writing is permitted among a storage region of the storage device;

storing the data stream in the data queue; and splitting data blocks associated with the data stream in the data queue to generate the plurality of split data streams.

17. The operation method of claim 15, wherein the method further comprises:

splitting the first data streams and the second data streams based on a desired reference data size.

18. The operation method of claim 17, wherein the method further comprises:

transmitting, to the first region, data streams having sizes smaller than the desired reference data size among the first data streams; and transmitting a merge request to the storage device, the merge request causing the storage device to merge the first data streams having sizes smaller than the desired reference data size, and store the merged data streams in the first region; and the storage device includes volatile memory, the first region being allocated on the at least one volatile memory device.

19. The operation method of claim 18, wherein the method further comprises:

determining whether a total size of the first data streams is less than the desired reference data size, and delaying transmission of the first data streams to the first region until the total sizes of the first data streams satisfies the desired reference data size.

20. The operation method of claim 17, wherein the method further comprises:

merging the second data streams having sizes smaller than the desired reference data size into one data stream.

\* \* \* \* \*